Feb. 12, 1963  J. C. LOUTON, JR., ETAL  3,077,125
SPEED REDUCING GEARING

Filed April 11, 1960  3 Sheets-Sheet 1

INVENTORS
James C. Louton, Jr.,
BY & Claud S. Semar

C. L. Spencer
ATTORNEY

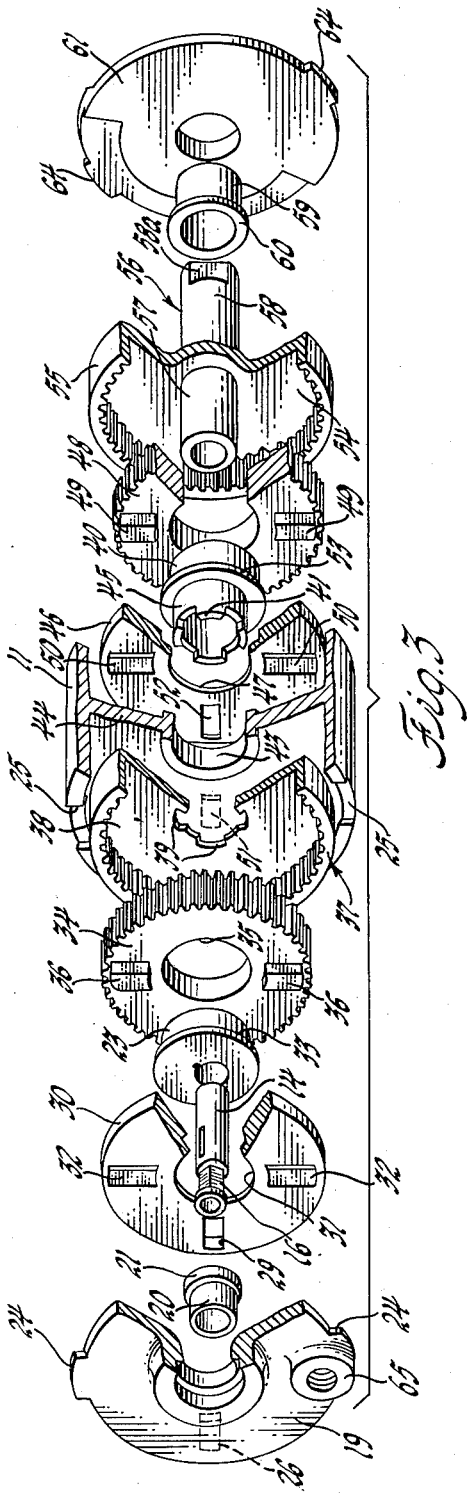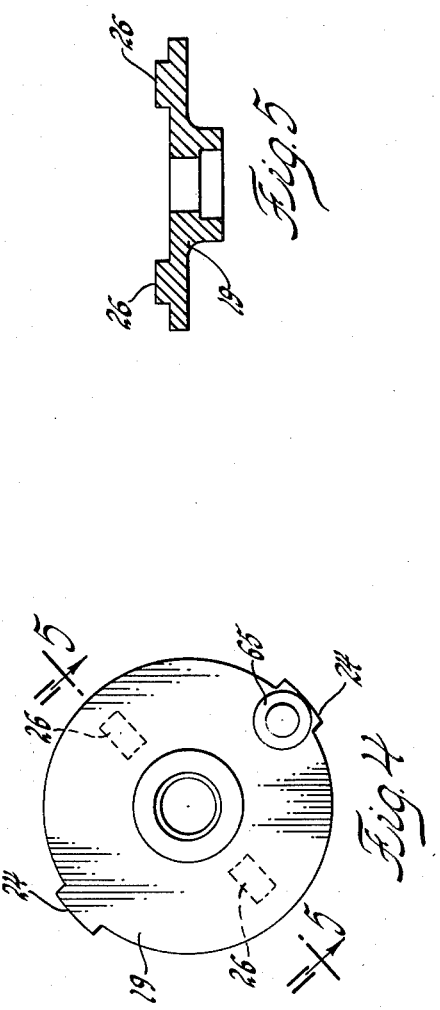

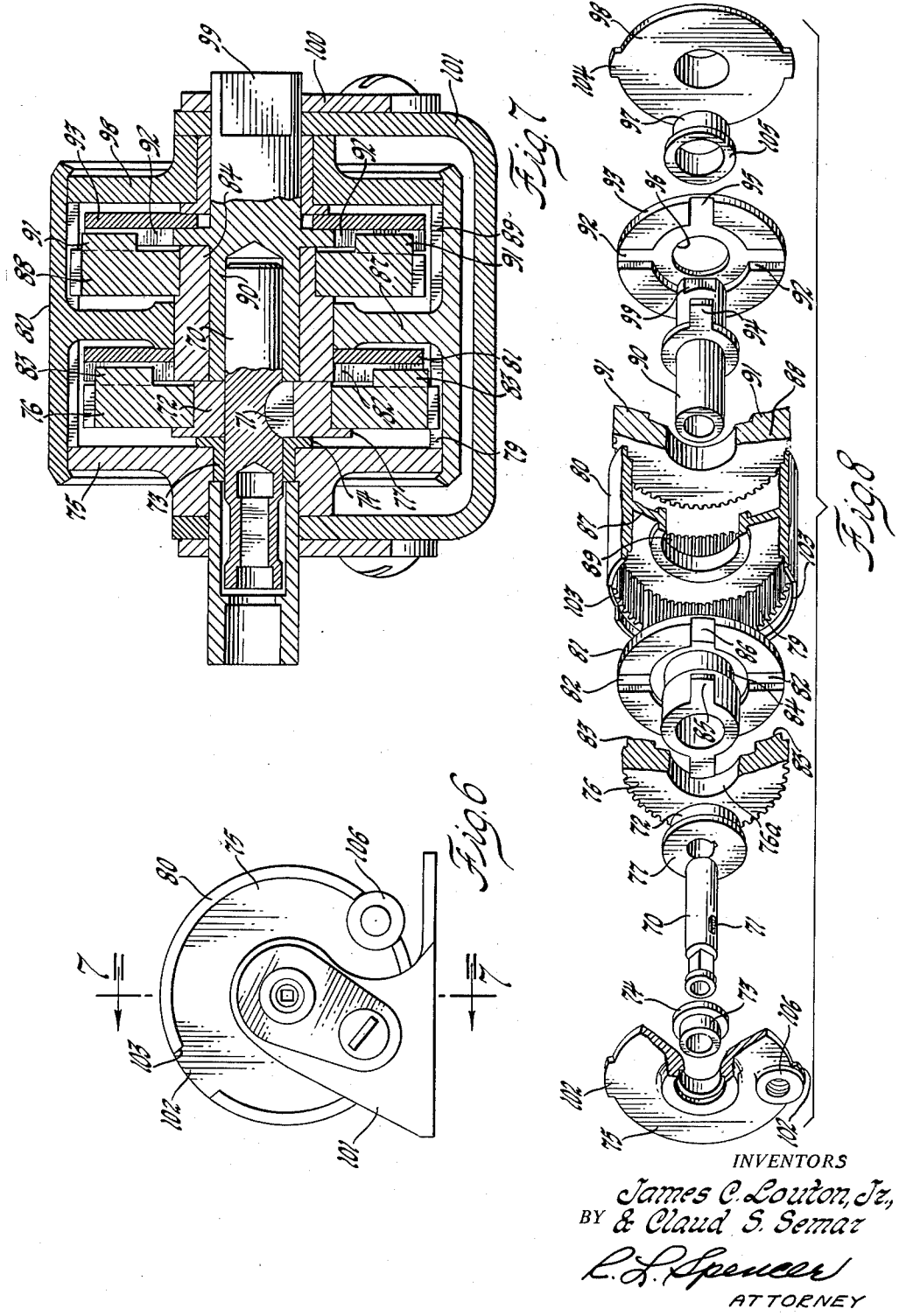
INVENTORS
James C. Louton, Jr.,
BY & Claud S. Semar
ATTORNEY

United States Patent Office 3,077,125
Patented Feb. 12, 1963

3,077,125
SPEED REDUCING GEARING
James C. Louton, Jr., Utica, and Claud S. Semar, Birmingham, Mich., assignors to General Motors Corporation, Detroit, Mich., a corporation of Delaware
Filed Apr. 11, 1960, Ser. No. 21,513
8 Claims. (Cl. 74—804)

This invention relates to gearing mechanism and more particularly to a conjugate epicyclic gearing mechanism adapted to provide very large gear reduction between an input member and output member.

An object of this invention is to provide a speed reduction gearing mechanism capable of providing a very large speed reduction and of compact design for use in applications where spaced limitations are critical.

Another object of this invention is to provide an epicyclic gearing incorporating involute spline tooth form allowing multiple teeth engagement and small package size for a given desired greater reduction and high load capacity.

An additional object of this invention is to provide epicyclic gearing incorporating concentric shaft arrangements allowing for assembling more than one unit on a common axis for compounding the reduction.

A further object of this invention is to provide an epicyclic gearing mechanism incorporating a sliding yoke arrangement which prevents rotation of one gear while permitting operation of the gearing mechanism in either clockwise or counterclockwise rotation.

Another object of this invention is to provide novel yoke mechanism for permitting oscillating motion of a pinion gear while connecting the oscillating gear to another member.

A particular object of this invention is to provide a two stage epicyclic gear reduction unit capable of high speed reduction, of compact construction and economical to manufacture.

These and other objects of this invention will be apparent from the following description and claims, in which:

FIGURE 3 is an exploded view of the various elements included in the speed reducing gear assembly.

FIGURE 4 is an end view of an inboard housing cap.

FIGURE 5 is a sectional view taken along the line 5—5 of FIGURE 4.

FIGURE 6 is an end view of a modified embodiment of the invention showing the housing supported for rotation in a support member.

FIGURE 7 is a sectional view taken along the line 7—7 of FIGURE 6.

FIGURE 8 is an exploded view of the assembly of FIGURE 8 with the support member removed.

Figure 1:
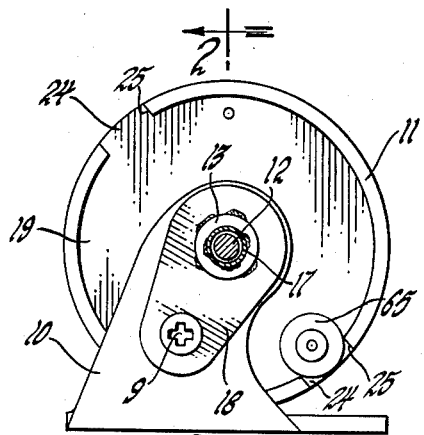
FIGURE 1 is an end view of a speed reducing gear assembly constructed in accordance with the principles of this invention illustrating gear assembly supported for rotation in a fixed support member.
Figure 2:
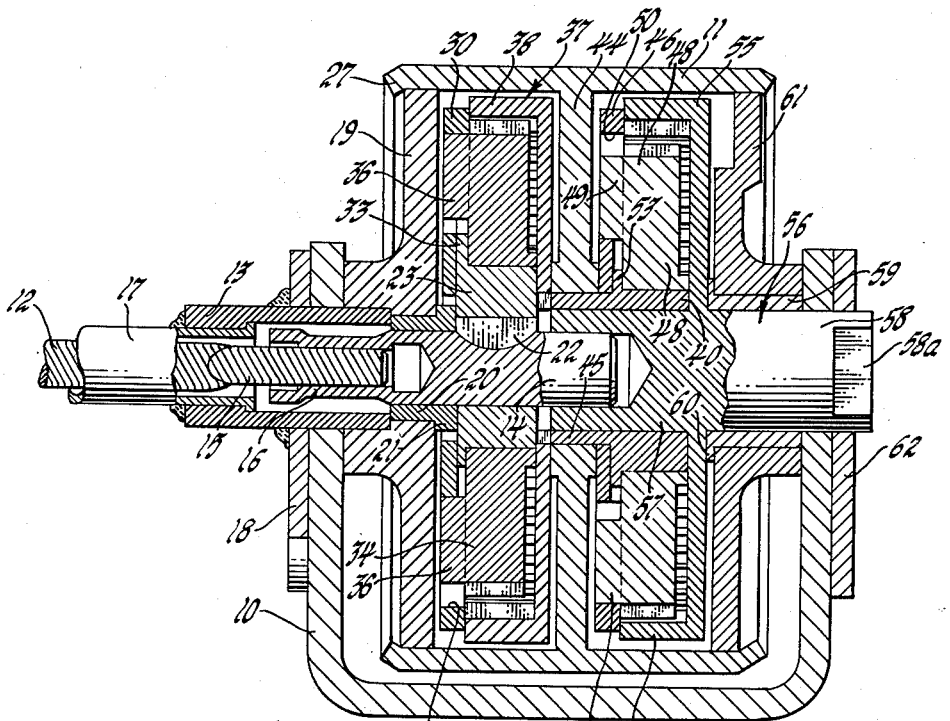
FIGURE 2 is a sectional view of the assembly taken along the line 2—2 of FIGURE 1.

Referring initially to FIGURE 2, there is shown a U-shaped support member 10 for supporting a housing 11. The support 10 will be fixed against rotation and housing 11 will be rotatable with respect to the support. A flexible shaft or cable 12 which may be driven at a relatively high speed of rotation extends through a ferrule 13 into a hollow power input shaft 14 for the gear unit. Shaft 12 is provided with a section having a square cross section 15 near its end and cooperates with a square cross section 16 of shaft 14, best shown in FIGURE 3, to accomplish rotation of shaft 14 in response to rotation of shaft 12. Shaft 12 may be protected by means of a flexible tube 17 fixed to ferrule 13. Ferrule 13 may be welded to a retainer 18, which is secured to support 10 by means of screws 9 shown in FIGURE 1. An inboard housing cap 19 is supported for rotation with respect to shaft 14 by means of a bushing 20 disposed between shaft 14 and cap 19. An eccentric cam 23 is keyed to shaft 14 by a key 22 for rotation therewith and is driven by shaft 14. Bushing 20 is provided with an annular upstanding flange 21 which acts as a spacer to maintain eccentric cam 23 in spaced relationship from end cap 19. Cap 19 has a pair of upstanding lugs 24 formed on the rim of the cap, the lugs 24 being disposed in slots 25 on housing 11 so that the cap and housing rotate as a unit. These are best shown in FIGURES 3 and 4. Housing 11 is swaged over the cap 19 at 27 to retain the housing and cap 19 in assembled relationship. Cap 19 has two axially extending lugs 26 formed on the internal surface of the cap and adapted to extend into slots 29 formed in a primary plate yoke 30 so that the yoke 30 and end cap 19 rotate as a unit. Yoke plate 30 is provided with a central opening 31 of greater diameter than rim 21 of bushing 20 and contains two radially extending slots 32 for purposes hereafter explained. A primary pinion gear 34 has a central opening 35 adapted to receive eccentric cam 23, the cam 23 and gear 34 being in frictional engagement. A pair of spaced axially protruding and radially extending lugs 36 on the side wall of gear 34 fit into slots 32 on yoke plate 30 so that gear 34 and yoke 30 rotate as a unit. An upstanding radial flange 33 on eccentric 23 separates the base of gear 34 from yoke plate 30, but permits the axially extending lugs 36 to fit into slots 32 of the yoke plate. An external primary ring gear 37 consists of a radially extending flange 38 with axially extending gear teeth adapted to mesh with gear 34. Gear 34 has two less teeth than ring gear 37. Rotation of eccentric cam 23 oscillates gear 34 which is connected to end cap 19 through primary yoke plate 30. As hereafter more particularly explained, cap 19 is connected to a load and therefore resists turning motion. Gear 34 expends energy or torque by causing clockwise rotation of gear 37 at greatly reduced speed to the speed of rotation of input shaft 14.

A secondary eccentric cam 40 is provided with spaced axially extending lugs 41 which mate with slots 39 formed in the base of flange 38 of gear 37. Lugs 41 extend through a central opening 43 of a central web 44 of housing 11. The portion 45 of cam 40 on which lugs 41 are formed is concentric whereas the portion 40 providing the cam action is eccentric. In the assembly the portion 45 extends through an opening 47 in a secondary yoke plate 46, the diameter of opening 47 being greater than that of portion 45. Eccentric 40 is rotated as a unit with ring gear 37. A secondary pinion gear 48 mounted on eccentric cam 40 carries axially protruding and radially extending lugs 49 adapted to fit into radial slots 50 in secondary yoke plate 46. Web portion 44 of housing 11 is provided with axially protruding and radially extending lugs 51 adapted to fit into radially extending slots 52 of yoke plate 46. Thus the pinion gear 48 is connected to housing web 44 through yoke plate 46. A flange 53 on cam portion 45 separates the base of gear 48 from yoke plate 46, but permits lugs 49 to enter slots 50. A secondary ring gear 55 is fixed to a shaft 56 having shaft portions 57 and 58 extending outwardly from opposite sides of a web 54. Shaft portion 57 extends through portion 45 of eccentric 48 and through opening 43 of housing 11. A bushing 59 on shaft portion 58 supports shaft portion 58 in an end cap 61, and has an upstanding flange 60 which serves to separate end cap 61 from the web 54 of gear 55. Shaft portion 58 is provided with a flat surface 58a adapted to cooperate with a retainer 62 secured to support yoke 10 to hold shaft 56 and gear 55 against rotation. End cap 61 is fixed for rotation with housing 11 by means of lugs 64 adapted to fit into slots (not shown) on housing 11 similar to the slots 25. Retainer 62, shown in FIGURE 2, is fixed to support yoke 10 by means of a screw, not shown. A boss 65 on end cap 19 may be threaded to receive linkage mechanism adapted to be actuated by the speed reducing gear unit. Gear 48 has 46 teeth, while gear 55 has 48 teeth.

Considering the operation of the speed reducer gearing, flexible shaft 12 is driven at a relatively high speed of rotation as by means of an electric motor. In the use contemplated, as for a seat adjusted for adjusting the position of a vehicle seat, the boss 65 constitutes the power take-off point and may be connected to seat adjuster linkage, not shown. Shaft 14 driven by shaft 12 drives primary eccentric 23 at the speed of rotation of shaft 12 causing high speed oscillation of 34. Pinion gear 34 is connected to end cap 19 through yoke 30, lugs 36, slots 32 in yoke 30, and lugs 26 on cap 19 which fit into slots 29 on yoke 30. Gear 34, yoke 30, end cap 19 and housing 11 rotate as a unit. Gear 34 has 46 teeth while mating ring gear 37 has 48 teeth. Assuming a clockwise rotation of eccentric cam 23, the oscillation of gear 34 causes clockwise rotation of gear 37 at greatly reduced speed. Although gear 34 tends to rotate in the opposite direction, due to the load applied to end cap 19 tending to resist rotation and due to the relatively large differences in speeds of rotation between the two gears, gear 34 is able to impart a clockwise rotation to gear 37. The reduction obtained by this stage is 1 to 24. Gear 37 therefore drives secondary cam eccentric 40 at 1/24 the speed of shaft 14 and primary eccentric cam 23. Clockwise rotation of secondary cam eccentric 40 causes oscillation of secondary pinion gear 48. Since gear 55 is held against rotation, gear 48 rotates counter-clockwise and drives housing 11 counterclockwise. The gear 48 is connected for rotation with housing 11 by means of secondary yoke 46, lugs 49 and slot 50, and lugs 51 and slot 52. The reduction of the second stage of the gearing is the same as that of the first stage or 24 to 1. The overall reduction of the gear unit is of the order of 576 to 1.

It will be understood that the arrangement is of very compact structure, gives a very high speed reduction, and is particularly adapted for use in applications where space limitations are critical, as for example in a vehicle seat adjuster where the speed reducer may be mounted underneath the vehicle seat, or in a vehicle door for operating window lift mechanism.

A second embodiment of the speed reducing gearing is shown in FIGURES 6 through 8. In this arrangement a power input shaft 70 rotates a primary eccentric cam 72 keyed to shaft 70 by a key 71. Shaft 70 is supported in a bushing 73 having a flange 74 thereon, the bushing 73 being carried by an end cap 75. Eccentric cam 72 carries a primary pinion gear 76 and has an upstanding flange 77. In the assembly, the flanges 74 and 77 act as spacers to space pinion gear 76 from end cap 75. A housing 80 has a first ring gear 79 mating with gear 76. Gear 76 has two less teeth than ring gear 79. A central opening 76a in gear 76 is frictionally engaged by eccentric cam 72. A primary sliding yoke 81 is provided with diametrically opposed slots 82 adapted to receive diametrically opposed lugs 83 formed on primary pinion gear 76 so that yoke 81 and gear 76 rotate as a unit. A secondary cam eccentric 84 is driven by sliding yoke 81, the cam 84 being connected to the primary yoke 81 by means of diametrically opposed flanges or lugs 85 formed on eccentric 84 and diametrically opposed slots 86 formed in primary yoke 81. Eccentric cam 84 is supported upon and extends through a central web 87 in housing 80. A secondary pinion gear 88 is supported upon cam eccentric 84, the gear 88 being in frictional engagement with secondary cam eccentric 84 and mating with a second ring gear 89 formed on housing 80. Pinion gear 88 has two less teeth than ring gear 89. Secondary cam eccentric 84 is supported for rotation upon a shaft 90.

Secondary pinion gear 88 is provided with a pair of diametrically opposed lugs 91 adapted to mate with diametrically opposed slots 92 formed in a secondary sliding yoke 93. A pair of upstanding diametrically opposed flanges 94 on shaft 90 mate with diametrically opposed slots 95 in secondary yoke 93. Shaft 90 extends through a central opening 96 in secondary yoke 93, a bushing 97 and an end cap 98. A flat surface 99 on shaft 90 is adapted to be received in a retainer 100 secured to a support yoke 101 so that shaft 90 is held against rotation. End cap 75 is secured to housing 80 for rotation with the housing by means of tabs 102 adapted to fit in slots 103 of housing 80. End cap 98 is secured to housing 80 by means of tabs 104 adapted to fit in suitable slots (not shown) similar to slots 103 on housing 80. Bushing 97 is provided with a flange 105 which serves as a spacer between secondary yoke 93 and end cap 98. End cap 75 has formed thereon a boss 106 which may be connected to suitable mechanism to be actuated, such as a seat adjusted linkage of a vehicle seat.

In the embodiment shown in FIGURES 6 through 8 the ring gear teeth are integral with the housing 80 and the motion is achieved through direct rotation of the oscillating pinions 76 and 88 with the housing. The rotation of input shaft 70 is in the same direction as that of input shaft 14 of FIGURE 3, but the direction of rotation of housing 80 is reverse to that of housing 11 of FIGURE 3. In the FIGURE 3 embodiment, the housing 11 rotates in the opposite direction to that of input shaft 14, whereas in the FIGURE 6 embodiment, the housing 80 rotates in the same direction as input shaft 70.

Assuming a counterclockwise rotation of input shaft 70, primary eccentric cam 72 also turns counterclockwise. Cam 72 imparts an eccentric motion to primary pinion gear 76, causing oscillating motion of gear 76. Gear 76 drives secondary eccentric cam 84 in a clockwise direction and at greatly reduced speed through primary sliding yoke 81. The gear reduction is 24 to 1 in this first stage. The eccentricity of secondary eccentric cam 84 is imparted to secondary pinion 88, causing oscillating motion of pinion 88. Shaft 90 is held against rotation, as is secondary yoke 93 which is connected to shaft 90 by flanges 94 on shaft 90 and slots 95 on the sliding yoke. With the gear 88 held against rotation by sliding yoke 93, the continued oscillation of gear 88 causes housing 80 to revolve in a counterclockwise direction. The gear reduction of the second stage is similar to the first stage reduction, or 24 to 1 so that the overall reduction is 576 to 1.

It will be apparent from the foregoing description that the gearing arrangements are very compact and designed to provide a very high degree of speed reduction. Each embodiment provides a two stage or double reduction, with resulting high load capacities, for example 600 pounds or over. The involute spline tooth form allows multiple tooth engagements and small package size for a greater reduction and high load capacity. The concentric shaft arrangements and the "stacking" or provision of more than one unit or stage on a common axis are for compounding the reduction to achieve higher ratios. The sliding yoke arrangement prevents reversal of the outer gear while allowing rotation in either direction. The drive provided is positive in either direction, the power input shaft of either embodiment being driven by a reversible electric motor. While the contemplated application for the gearing mechanism is in connection with linkage for lifting a vehicle seat, the gearing may be used for vehicle window lift or other suitable applications.

We claim:

1. In a transmission, a power input member, an eccentric cam rotated by said power input member, a pinion gear supported upon said eccentric cam and in mesh with a second gear, a power delivery member adapted to be connected to a load, means connecting said pinion gear to said power delivery member for rotation therewith as a unit, a second eccentric cam driven by said second gear, a secondary pinion gear supported upon said second eccentric cam and in mesh with a fourth gear, means for preventing rotation of said fourth gear, and means connecting said secondary pinion gear to said power delivery member.

2. In a transmission, a power input shaft, a rotatable housing, an eccentric cam driven by said power input shaft, a primary pinion gear mounted upon said eccentric cam, means connecting said pinion to said housing for rotation therewith as a unit, a second gear in mesh with said primary pinion gear, a second eccentric cam driven by said second gear, a secondary pinion gear supported upon said second eccentric cam, a fourth gear in mesh with said secondary pinion gear, means for preventing rotation of said fourth gear, and means connecting said secondary pinion gear to said housing for rotation therewith as a unit.

3. In a transmission, a power input shaft, a rotatable housing, a primary eccentric cam rotated by said input shaft, a primary pinion gear supported upon said eccentric cam and in mesh with a ring gear, means connecting said primary pinion gear to said housing for rotation therewith as a unit including a primary yoke plate, said primary pinion gear being movable with respect to said yoke plate for oscillating motion, a secondary cam driven by said ring gear, a secondary pinion gear supported upon said secondary cam and in mesh with a secondary ring gear, means preventing rotation of said secondary ring gear, and means connecting said secondary pinion gear to said housing for rotation therewith as a unit including a second yoke plate, said secondary pinion gear being movable with respect to said second yoke plate for oscillating motion.

4. In a transmission, a rotatable housing comprising an external cylindrical surface and a web member, a first housing cap fixed to said housing for rotation therewith, a power input shaft supported for rotation in said end cap, a primary eccentric cam driven by said power input shaft, a primary pinion gear supported on said eccentric, and in mesh with a primary ring gear, means connecting said primary pinion gear to said end cap for rotation therewith including a primary yoke plate disposed between said primary pinion gear and said end cap, said primary pinion gear being capable of oscillating motion with respect to said yoke plate, a secondary eccentric cam supported for rotation in said web member and driven by said ring gear, a secondary pinion gear driven by said secondary eccentric cam and in mesh a second ring gear, a second housing cap fixed to said housing for rotation therewith, a shaft fixed to said second ring gear and extending through said second end cap, means for preventing rotation of said last-mentioned shaft and said second ring gear, and means forming a drive connection between said web and said secondary pinion gear including a secondary yoke plate disposed between said secondary pinion gear and said web, said secondary yoke plate permitting oscillation of said secondary pinion gear in response to rotation of said secondary cam.

5. In a transmission, a rotatable cylindrical housing having a central support web thereon extending transverse of said housing intermediate the ends of said housing, first and second end caps fixed to said housing for rotation therewith, a concentric sleeve rotatably supported in said web, a U-shaped support member rotatably supporting said end caps, respectively, therein, a reaction shaft fixed against rotation and supported in said second end cap and said sleeve, a rotatable power input shaft piloted in said reaction shaft and rotatably supported in said first end cap, a primary eccentric cam driven by said power input shaft, a primary pinion gear supported for oscillating motion on said primary eccentric cam and rotatable as a unit with said housing, a primary ring gear carried by said sleeve for driving said sleeve and in mesh with said primary ring gear, a secondary eccentric cam on said sleeve and rotatable therewith, a secondary pinion gear supported for oscillating motion on said secondary eccentric cam, means connecting said secondary pinion gear to said web for rotation therewith as a unit, and a reaction ring gear in mesh with said secondary pinion gear fixed to said reaction shaft and held against rotation by said reaction shaft.

6. In a transmission, a rotatable cylindrical housing having a support web thereon extending transverse of said housing intermediate the ends of said housing, first and second end caps fixed to said rotatable housing and rotatable therewith, a U-shaped support member, a power input shaft, a reaction shaft fixed against rotation, said power input shaft having one end thereof piloted for rotation in said reaction shaft and being supported for rotation in said first end cap, said reaction shaft extending through said second end cap to the exterior of said housing, means for preventing rotation of said reaction shaft, an eccentric cam driven by said power input shaft, a primary pinion gear supported upon said eccentric cam for oscillating motion, means connecting said pinion gear to said first end cap for rotation therewith, a primary ring gear driven by said pinion gear, a concentric sleeve rotatably supported in said web and driven by said ring gear, said reaction shaft being supported in said sleeve, a secondary eccentric cam on said sleeve and rotatable therewith, a secondary pinion gear supported for oscillating motion on said secondary eccentric cam, a non-rotatable reaction gear fixed to said reaction shaft and in mesh with said secondary pinion gear, and means connecting said secondary pinion gear to said web for rotating said web and cylindrical housing in response to rotation of said secondary pinion gear.

7. In a transmission, a rotatable cylindrical housing having a support web fixed thereto for rotation therewith and extending transverse of said housing intermediate the ends of said housing, first and second end caps fixed to said housing and rotatable therewith, a U-shaped support member, a reaction shaft fixed to said support member extending through said second end cap and through said web, a rotatable sleeve on said reaction shaft and supported for rotation in said web, a rotatable power input shaft supported for rotation in said first end cap and piloted in said reaction shaft, a primary eccentric cam keyed to said power input shaft for rotation therewith, a primary pinion gear mounted on said primary eccentric cam for oscillating motion, a primary yoke plate connecting said pinion gear to said first end plate whereby said pinion gear rotates as a unit with said end plate, a primary ring gear in mesh with said primary pinion gear, means connecting said primary ring gear to said sleeve for rotating said sleeve, a secondary eccentric cam on said sleeve and rotatable therewith, a secondary pinion gear supported for oscillating motion on said secondary eccentric cam, a reaction ring gear carried by said reaction shaft and fixed against rotation by said reaction shaft, said reaction ring gear being in mesh with said secondary pinion gear, and means including a second yoke plate for connecting said secondary pinion gear to said web for rotation therewith as a unit.

8. In a transmission, a power delivery member comprising a rotatable cylindrical housing having first and second end caps fixed for rotation with said housing and a web member extending transversely of said housing intermediate said end caps, first and second ring gears formed on the interior surface of said housing at opposite sides of said web, respectively, a U-shaped support member, a reaction shaft extending through one of said end caps and an arm of said support member and fixed against rotation by said arm, said reaction shaft rotatably supporting said one end cap thereon, a power input shaft extending through the other of said end caps and having its inner end piloted in the inner end of said reaction shaft, a sleeve member extending through said web, said sleeve being concentric with the piloted ends of said shafts and supporting the inner ends of said shafts in said web, a primary eccentric cam disposed at one side of said web and driven by said power input shaft, a primary pinion gear seated on said primary eccentric cam having teeth in mesh with said first ring gear, means connecting said sleeve to said primary pinion gear for rotation with said gear including a sliding yoke disposed between said primary gear and said web, a secondary eccentric cam formed on said sleeve at the side of said web opposite said primary pinion gear, a secondary pinion gear supported upon said secondary eccentric cam and having teeth in mesh with said second ring gear, and means connecting said secondary pinion gear to said reaction shaft for preventing rotation of said secondary pinion gear including a sliding yoke disposed between said secondary pinion gear and said one end cap.

References Cited in the file of this patent

UNITED STATES PATENTS

| | | |
|---|---|---|
| 1,658,767 | Hall | Feb. 7, 1928 |
| 2,303,365 | Karlsen | Dec. 1, 1942 |
| 2,354,387 | Lawler | July 25, 1944 |
| 2,884,815 | Pittman | May 5, 1959 |